(12) United States Patent
Subramanian (10) Patent No.: US 8,550,369 B2
(45) Date of Patent: Oct. 8, 2013

(54) PROGRAMMABLE WATER HEATER THERMOSTAT CONTROLLER

(75) Inventor: Narayanan M Subramanian, Marietta, GA (US)

(73) Assignee: Invention Dynamics, LLC., Marietta, GA (US)

( * ) Notice: Subject to any disclaimer, the term of this patent is extended or adjusted under 35 U.S.C. 154(b) by 691 days.

(21) Appl. No.: 12/877,156

(22) Filed: Sep. 8, 2010

(65) Prior Publication Data

US 2011/0062248 A1  Mar. 17, 2011

Related U.S. Application Data

(60) Provisional application No. 61/241,480, filed on Sep. 11, 2009.

(51) Int. Cl.
*F23N 1/08*      (2006.01)
*G05D 15/00*   (2006.01)
*H05B 1/02*      (2006.01)
*B60H 1/00*     (2006.01)

(52) U.S. Cl.
USPC .................... 236/20 R; 219/490; 237/8 A (58) Field of Classification Search
USPC ................ 236/20 R, 40 R; 122/14.1, 14.2; 219/490, 491, 492; 237/8 A, 8 B; 392/463
See application file for complete search history.

(56) References Cited

U.S. PATENT DOCUMENTS 5,968,393 A * 10/1999 Demaline ................ 219/492
7,065,431 B2 * 6/2006 Patterson et al. ......... 700/299

* cited by examiner

*Primary Examiner* — Chen Wen Jiang (57) ABSTRACT

A programmable water heater thermostat controller that attaches over the temperature control unit of existing gas or electric water heaters. The user programs the temperature of water required at different times of the day. A microcontroller then compares the current temperature setting against desired setting every minute and rotates the temperature control knob accordingly using a geared electric motor. If vacation mode is chosen, then the microcontroller skips program times and keeps the temperature control knob at the lowest temperature setting.

21 Claims, 11 Drawing Sheets

PROGRAMMABLE WATER HEATER THERMOSTAT CONTROLLER

PRIORITY CLAIM

This patent application claims priority from provisional U.S. patent application entitled "Programmable water heater thermostat controller", having an application No. 61/241,480 filed on Sep. 11, 2009, the contents of which are incorporated herein by reference.

FIELD OF INVENTION

The present invention relates to controlling the thermostat on both electric and gas powered water heaters based on user programmed settings.

BACKGROUND OF INVENTION

Water heaters come with a thermostat to adjust the temperature of water. When the set temperature is reached, the burner in gas powered water heater or the electric coil in electric water heater is turned off. When the temperature drops below the set temperature, the water heater is turned on again. This process repeats all the time. The user sets the temperature high enough to get hot water during periods of peak usage even on the coldest day of the year. This temperature is maintained during the day as well as night when there is not much need for hot water. People seldom change the setting of the thermostat. Hence the high temperature is maintained even during summer. This results in wastage of fuel. This also shortens the life of the water heater. There is a need for a programmable thermostat that can be programmed to heat water in the morning to the required high temperature, then turn down the thermostat during daytime when there is no one in the house to use hot water, turn it up again to a moderate temperature in the evening for dinner time usage and turn it down for the night. Since there are already millions of water heaters in use, the programmable thermostat should be easy to install on an existing water heater.

In U.S. Pat. No. 6,920,843, William Wilson uses a solenoid in the gas supply line to interrupt supply of gas. It has two drawbacks. The first is that the user will have to get the unit installed by a licensed plumber. The second drawback is that the manufacturer warranty may be voided since we are tampering with the original design of the product. So this is not a practical one. In U.S. Pat. Nos. 7,380,522 and 6,375,087, the system has to be built in by the manufacturer. It cannot be attached to the millions of water heaters already in use.

SUMMARY OF INVENTION

The primary objective of the present invention is to conserve energy by way of a programmable controller that can vary the temperature setting at different times of the day.

Another objective of the present invention is to make it easy for anyone to attach the unit to an existing water heater without the need to call a plumber.

A third objective is to make the unit cost effective for the consumers to buy and use it.

The foregoing objectives are attained by having a programmable microcontroller vary the temperature setting by turning the temperature control knob based on user preprogrammed temperature settings at user preprogrammed times of the day.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the concept, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
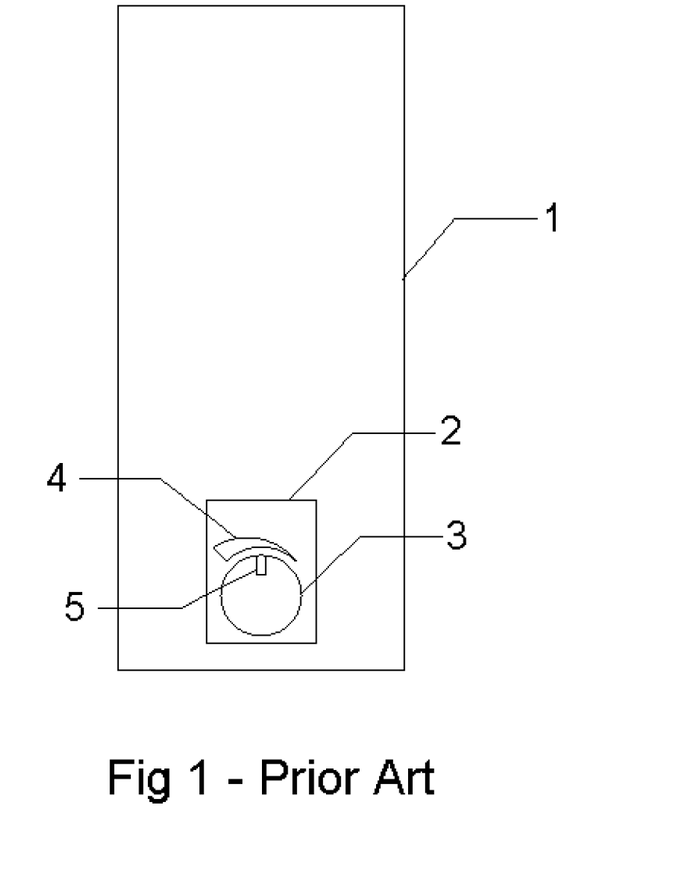
FIG. 1 is the prior art of a storage type water heater with a temperature control unit.

FIG. 1 is the prior art of a storage type water heater, 1. Unit 1 has a temperature control unit 2, to control the temperature of water heated. Temperature control unit 2 has a temperature control knob 3 that the user turns to set the desired temperature for hot water. Arc 4 above the temperature control knob shows the direction the temperature control knob should be turned to increase water temperature. In this illustration, the temperature control knob should be turned in a counter clockwise direction to increase water temperature. Position indicator, 5, on the temperature control knob 3, shows the temperature setting with respect to arc 4.

Figure 2:
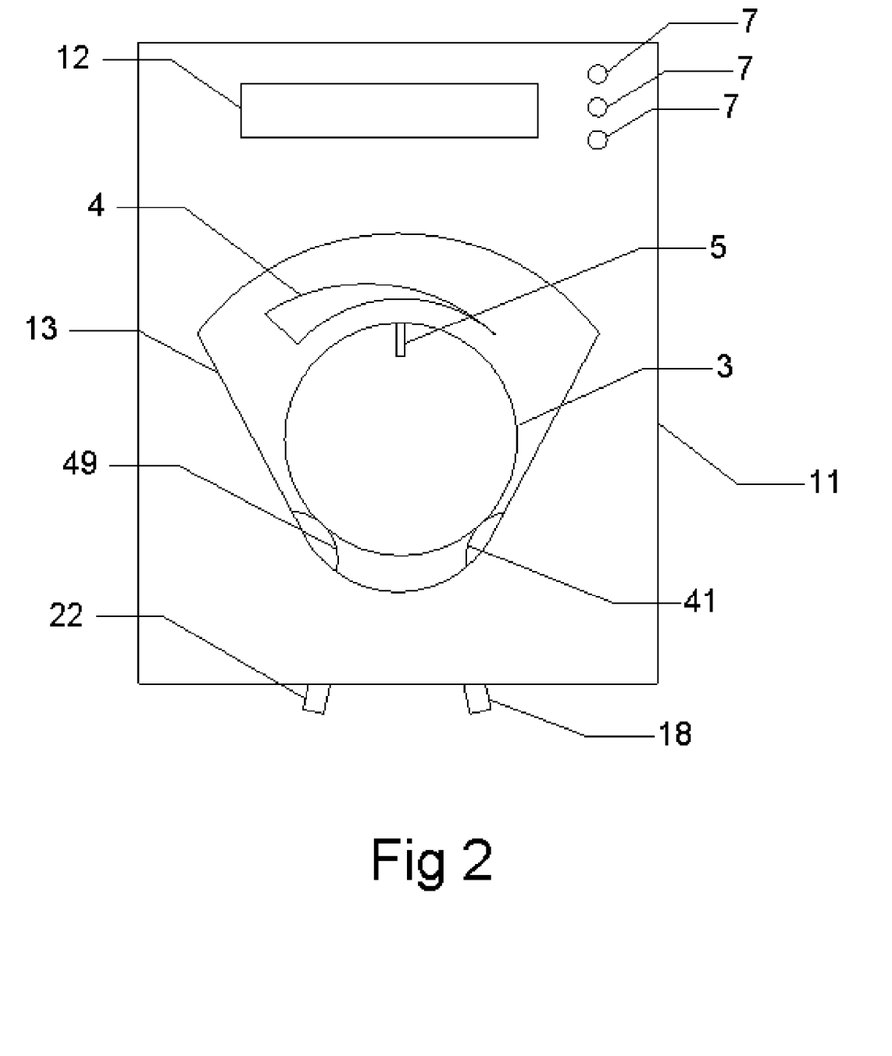
FIG. 2 is the front view of the preferred embodiment of the programmable water heater thermostat controller attached to the temperature control unit on the water heater.

FIG. 2 shows the front view of the preferred embodiment of a programmable water heater thermostat controller of the present invention mounted on top of temperature control unit 2. The programmable water heater thermostat controller of the present invention consists of a faceplate, 11 with a first display means, 12, to display the current time, or, at the time of programming, the program information, which will be discussed later. Faceplate, 11, has a window, 13, through which the temperature control knob 3 and the temperature indicating arc 4 can be seen. A plurality of switches, 7, are used as first user input means. These switches are used to program user desired time and corresponding user desired temperature information. The components of the present invention are mounted on the reverse side of faceplate 11 as shown in FIG. 3.

Referring to FIG. 2, FIG. 3, FIG. 5 and FIG. 6, an electronic circuit board, 28, with a microcontroller 50 on it, is connected by wire to said first display means, 12 and a first transmitter/receiver means, 23. The plurality of switches, 7, are also mounted on the electronic circuit board, 28. On the periphery of window 13 are two subsystems, numbered 19 and 24. Subsystem 19, henceforth called the position sensing means, consists of a driven pinch roller 49, fixedly attached to shaft 45 of a potentiometer, 26. The potentiometer has three terminals, 46, 47 and 48. Terminal 46 is connected to +5 volts supply. Terminal 48 is connected to ground. Terminal 47 is connected to analog to digital input pin 56 of microcontroller 50. Since the resistance varies when the potentiometer knob is turned, it is a good candidate as a rotation sensor. The position sensing means is fixedly mounted on the first end of a sensor mount, 20, while the second end, 22, of sensor mount sticks out from faceplate, 11. Sensor mount 20 is attached rotatetably to faceplate 11 at second pivot point 21. A wire, 27, with three conductors, connects potentiometer 26 with said electronic circuit board, 28.

Figure 3:
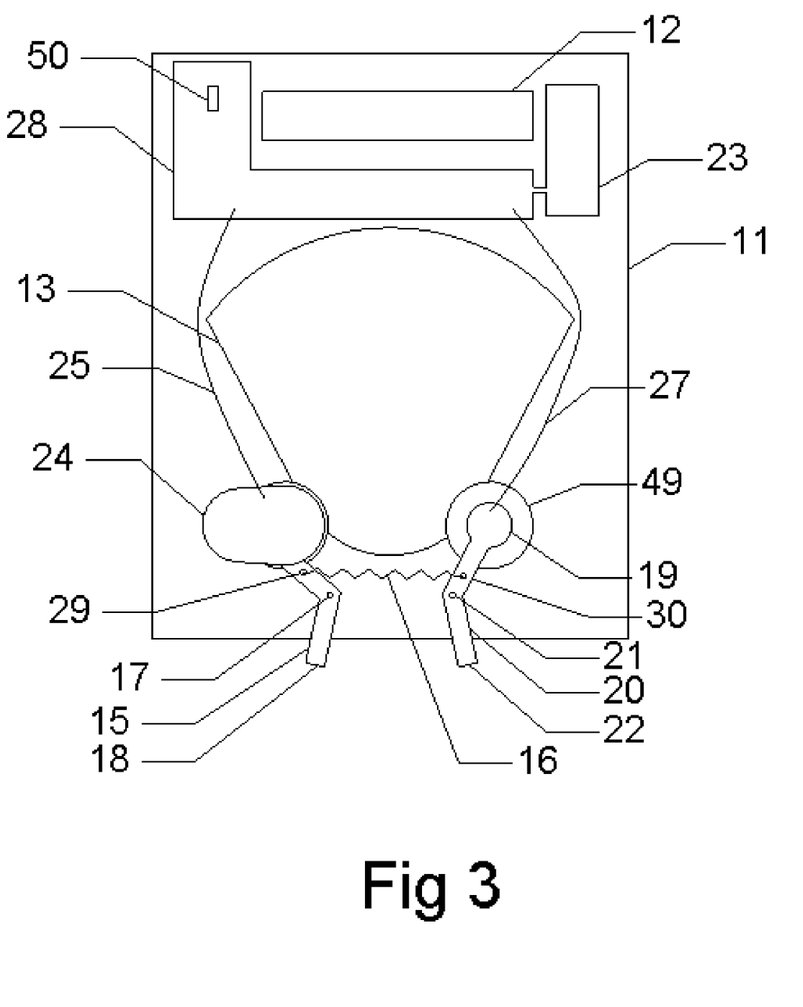
FIG. 3 is the rear view of the preferred embodiment of the programmable water heater thermostat controller with the internal parts revealed.
Figure 4:
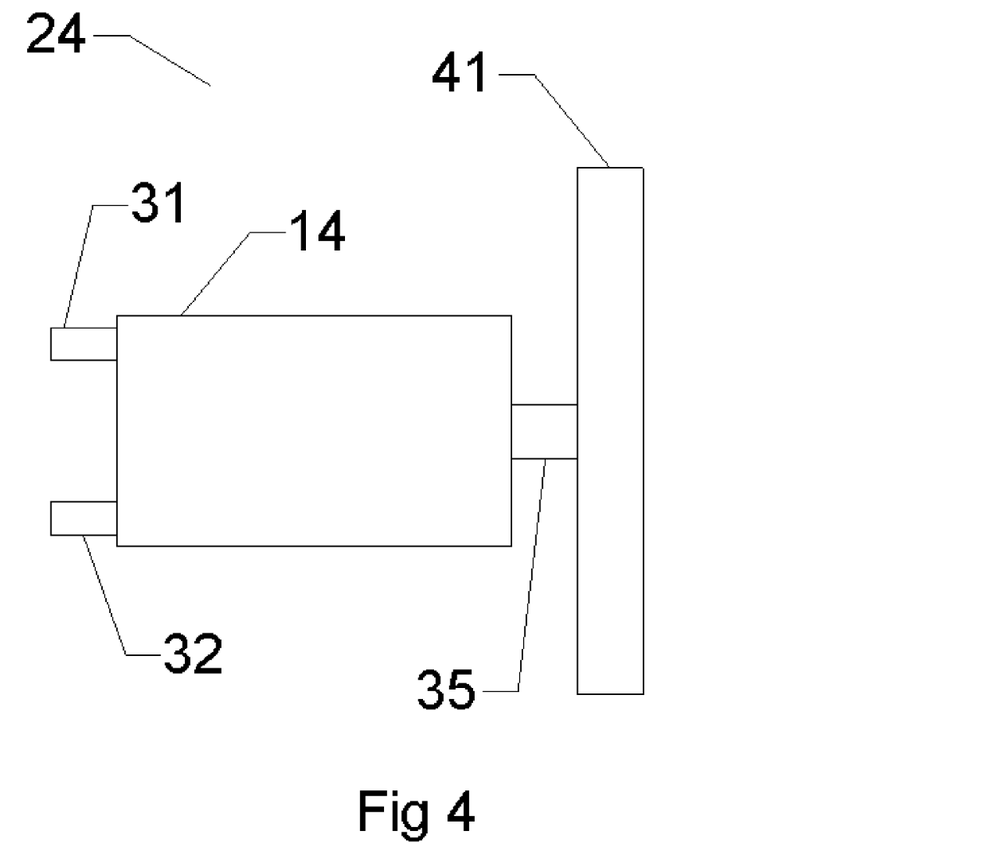
FIG. 4 is a side view of the drive means.
Figure 5:
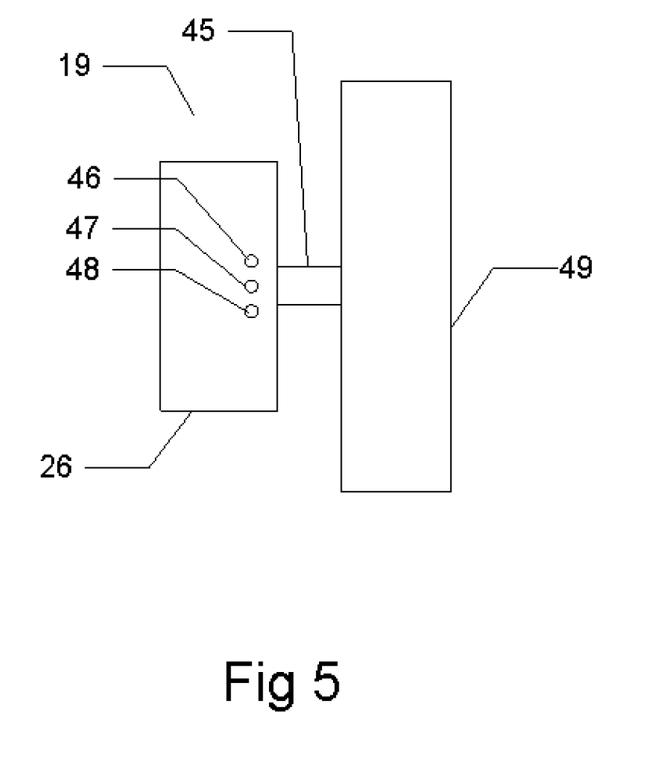
FIG. 5 is the side view of the position sensing means that is used to sense the position of the temperature control knob on the water heater.

Referring to FIG. 2, FIG. 3 and FIG. 4, drive means, 24, is used to turn temperature control knob, 3. Drive means 24 consists of a geared electric motor, 14, and a driver pinch roller, 41. Shaft, 35, of the geared electric motor is rigidly connected to said driver pinch roller, 41. Drive means 24 is fixedly mounted on the first end of a driver mount 15 while second end, 18, of the driver mount sticks out from faceplate 11. Driver mount 15 is attached rotatetably to faceplate 11 at first pivot point 17. A tension spring, 16, with a first end and a second end connects driver mount, 15, with sensor mount, 20. First end of tension spring is connected to driver mount 15 at first attachment point, 29. Second end of tension spring is connected to sensor mount, 20, at second attachment point, 30. The spring tension keeps driver pinch roller, 41, and driven pinch roller, 49, pressed against temperature control knob 3 when the programmable water heater thermostat controller is mounted on temperature control unit, 2. A wire, 25, with two conductors, connects geared electric motor 14, to the electronic circuit board, 28. When the second end, 18, of driver mount and the second end, 22, of sensor mount are pushed toward each other, the driver pinch roller and the driven pinch roller disengage from the temperature control knob. This is done when the programmable water heater thermostat controller is installed or uninstalled from the temperature control unit.

Figure 6:
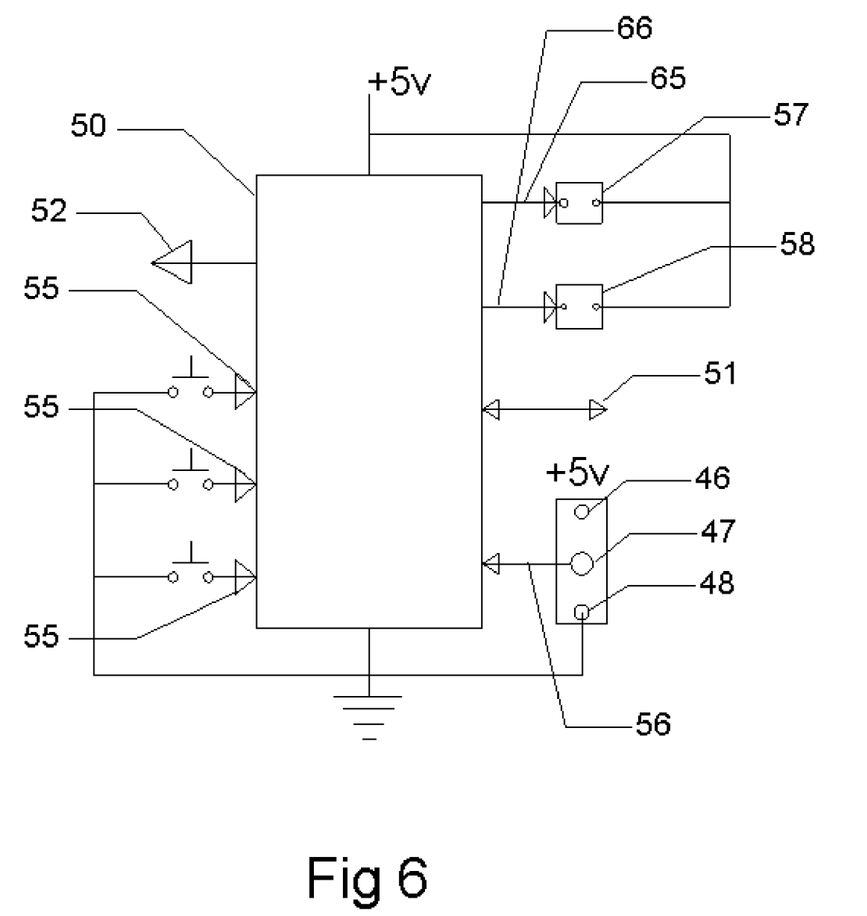
FIG. 6 is a block diagram of the electronic circuit board used to control the rotation of the temperature control knob.

FIG. 6 is a block diagram of the input/output connection to microcontroller, 50. The plurality of switches, 7, are connected to a plurality of input pins, 55, on said microcontroller. The microcontroller accepts program time and corresponding temperature information from the user through said plurality of switches 7. It outputs display information to said first display means, 12 via a set of output pins, collectively numbered 52. The analog to digital input pin 56 of the microcontroller is connected to the center tap terminal 47 of potentiometer 26. The voltage between ground and terminal 47 varies proportional to the rotational position of temperature control knob 3. The analog value of the voltage on pin 56 passes through an analog to digital converter on the microcontroller to provide a corresponding digital value for the position of the potentiometer shaft and thereby, the position of the temperature control knob, 3. Output pin 65 of the microcontroller is connected to one terminal of relay coil in relay 57 while the other terminal of the relay coil is connected to the positive power supply. Similarly, output pin 66 of the microcontroller is connected to one terminal of relay coil in relay 58 while the other terminal of the relay coil is connected to the positive power supply. The two relays are of the single pole double throw (SPDT) type. The direction of rotation of the geared electric motor is controlled by controlling power to the coils in the two relays. The microcontroller communicates with the first transmitter/receiver means, 23, via input/output pin 51.

Figure 7:
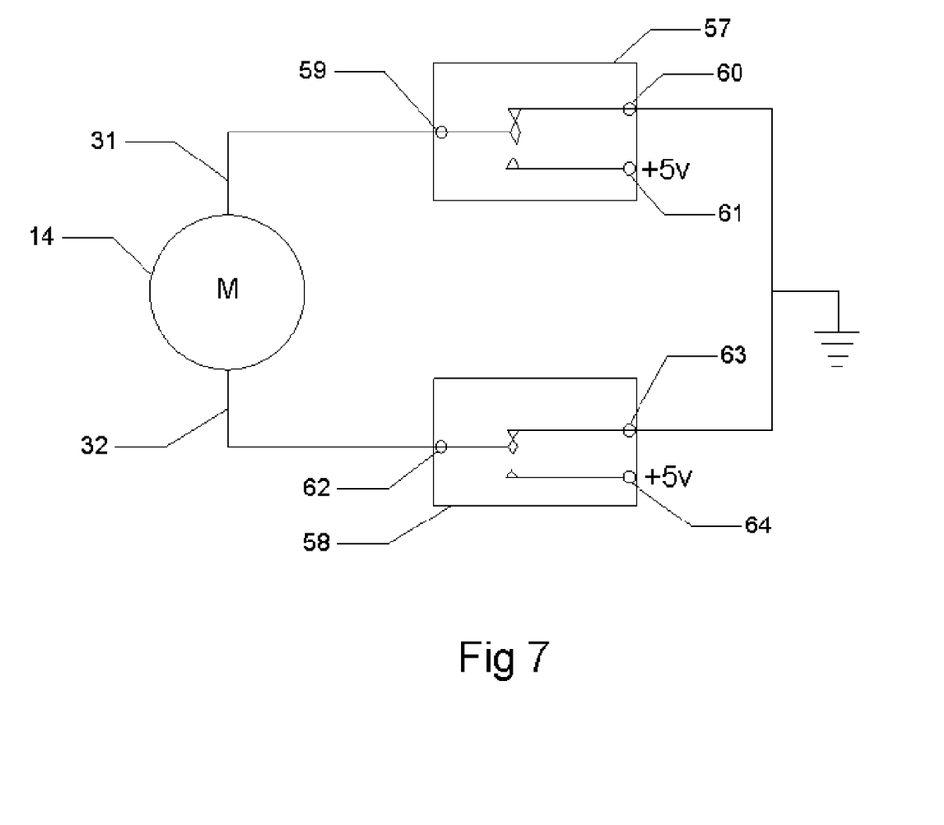
FIG. 7 is a schematic circuit diagram to control the direction of rotation of the geared electric motor shaft using two single pole double throw relays.

FIG. 7 is a schematic diagram of the relay contact connection with the geared electric motor. Each relay has two fixed contacts and one moveable contact. In relay 57, the moveable contact, 59, is connected to terminal 31 on geared electric motor 14. Fixed contact 60 is connected to ground while fixed contact 61 is connected to +5 volts. Similarly, in relay 58, the moveable contact, 62, is connected to terminal 32 on geared electric motor 14. Fixed contact 63 is connected to ground while fixed contact 64 is connected to +5 volts. When the coil in relay 57 is not energized, moveable contact 59 is in electrical communication with fixed contact 60. When the coil in relay 57 is energized, contact 59 is in electrical communication with contact 61. Similarly, when the coil in relay 58 is not energized, moveable contact 62 is in electrical communication with fixed contact 63. When the coil in relay 58 is energized, contact 62 is in electrical communication with fixed contact 64.

When relay 57 and relay 58 are de-energized, the two terminals of the geared electric motor are connected to ground. Hence the geared electric motor will not turn. When only relay 57 is energized by output signal on pin 65, geared electric motor terminal 31 is at +5 volts with respect to terminal 32. Hence the geared electric motor is energized and turns in one direction. Let us assume it to be clockwise direction. When only relay 58 is energized by output signal on pin 66, geared electric motor terminal 32 is at +5 volts with respect to terminal 31. Hence the geared electric motor is energized but with the polarity of the terminals reversed. Hence the geared electric motor will turn in the counter clockwise direction. Thus, by controlling the output signal on pins 65 and 66 of the microcontroller, the direction of rotation of the geared electric motor and thereby, the direction of rotation of the temperature control knob can be controlled.

Figure 8:
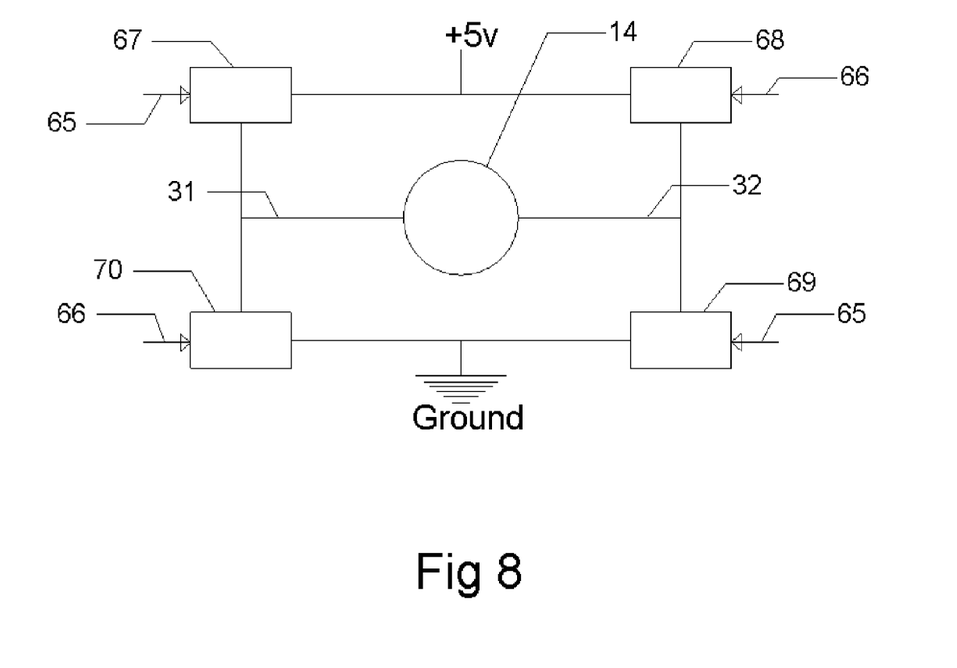
FIG. 8 is a schematic circuit diagram to control the direction of rotation of the geared electric motor shaft using four opto-isolators.

FIG. 8 shows another implementation of the geared electric motor control. Here four opto-isolators, 67, 68, 69 and 70 are used. The opto-isolator will conduct only when the LED in the opto-isolator is energized. In the configuration shown in FIG. 8, the input to opto-isolators 67 and 68 are connected to +5 v power supply. The output from opto-isolators 69 and 70 are connected to ground. The output of 67 is connected to terminal 31 of the geared electric motor as well as the input of 70. Similarly, output of 68 is connected to terminal 32 of the geared electric motor as well as the input of 69. Output pin 65 of the microcontroller is connected to control pin of both 67 and 69. Output pin 66 of the microcontroller is connected to control pin of both 68 and 70. When there is an output signal only on pin 65, opto-isolators 67 and 69 are active. This completes the circuit for the geared electric motor through +5 v—67-31—geared electric motor—32-69—ground. For this, let us assume that the shaft of the geared electric motor rotates in a clockwise direction. When there is an output signal only on pin 66, opto-isolators 68 and 70 are active. This completes the circuit for the geared electric motor through +5 v—68-

32—geared electric motor—31-70—ground. Since the polarity on the geared electric motor terminals is reversed, the shaft of the geared electric motor will now turn in a counter clockwise direction. Thus by controlling the output signal on pins 65 and 66 of the microcontroller, the direction of rotation of the geared electric motor and thereby, the direction of rotation of the temperature control knob can be controlled.

Figure 9:
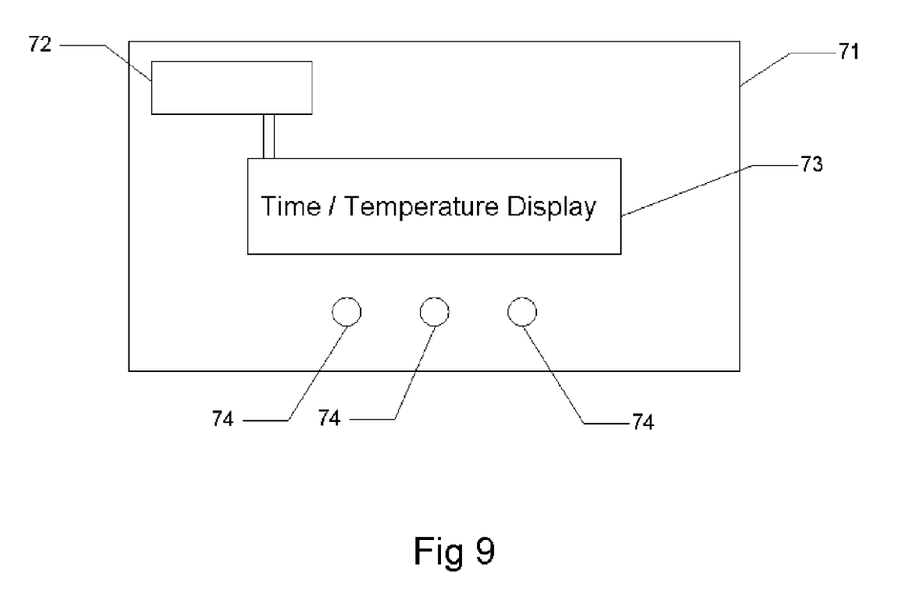
FIG. 9 is the block diagram of the remote user interface.

FIG. 9 is a block diagram of the remote user interface, 71. It consists of a plurality of switches, 74, to act as the second user input means. It also has a second display means, 73, and a second transmitter/receiver means, 72. In this, the second transmitter/receiver means is designed to communicate seamlessly with the first transmitter/receiver means. Thus the user need not go to the basement where the water heater is generally kept. They can use the remote user interface from any location in the house to change the time and temperature settings programmed.

Figure 10:
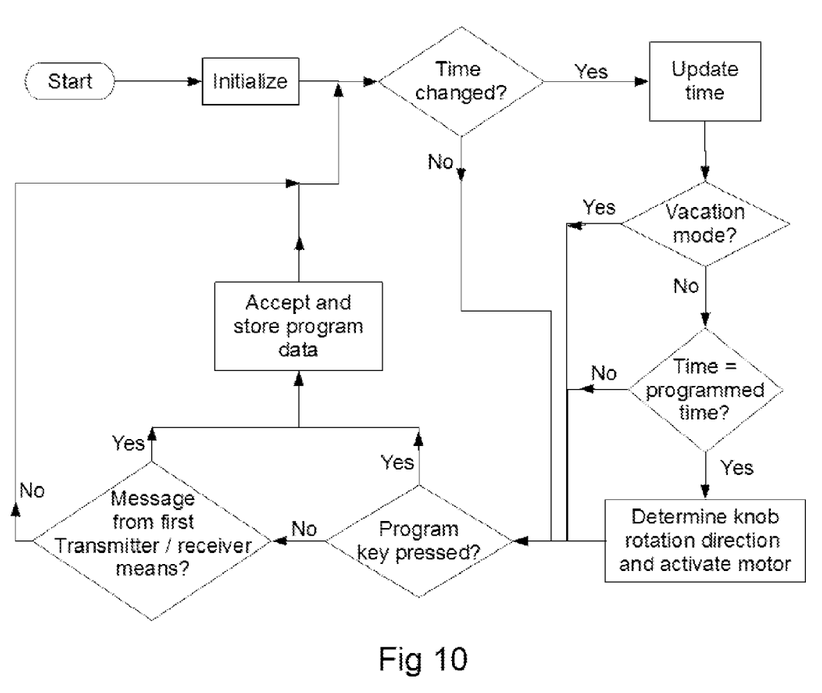
FIG. 10 is the flowchart of the decision process used by the microcontroller to rotate the temperature control knob at different times of the day. It also shows the logic used to program the time and temperature information by the user. Vacation mode decision logic is also illustrated.

FIG. 10 shows the decision logic used by the microcontroller to turn the temperature control knob based on current time and the user desired temperature settings stored by the user. It also shows the decision logic used when the vacation mode is selected by the user. The microcontroller keeps checking its input lines to see if any user data is coming to it to process. If there is any user input on any of its input lines, it goes into programming mode to accept and store user furnished time and corresponding temperature data.

Figure 11:
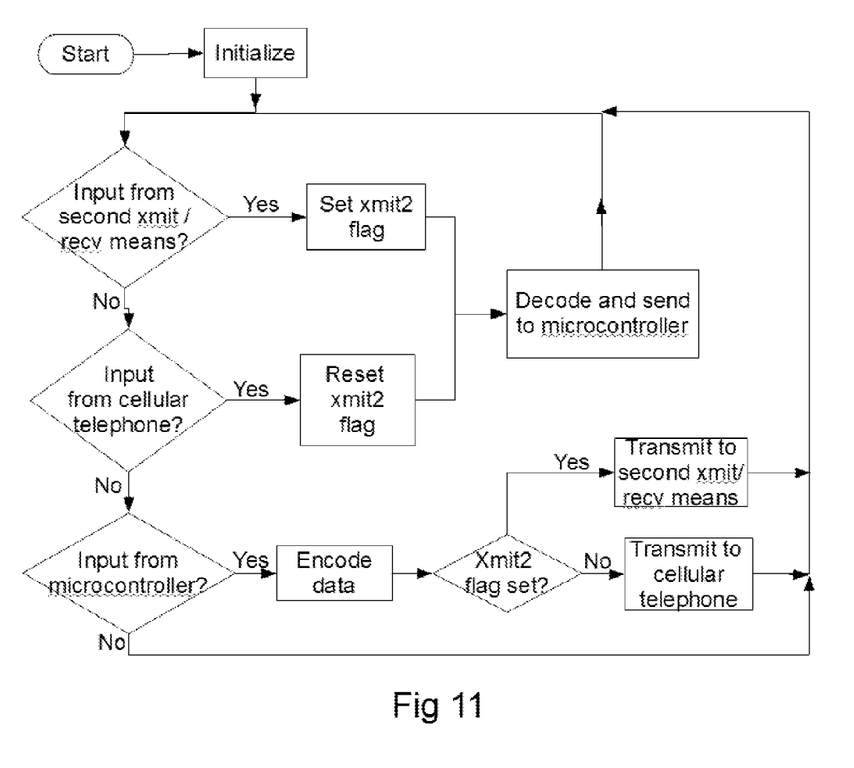
FIG. 11 shows the flowchart of the decision process used by the first transmitter/receiver means.

FIG. 11 shows the decision logic used by the first transmitter/receiver means to receive data and transmit to the correct recipient.

To attach the present invention to the temperature control unit 2, on water heater, 1, the user presses or pushes the ends 18 and 22 protruding out from faceplate 11 toward each other so that the drive means and the position sensing means are moved farther away from each other. He places the programmable water heater thermostat controller on top of temperature control unit, 2 and then releases the grip on 18 and 22. Because of tension spring, 16, driver pinch roller 41 and driven pinch roller 49 move toward each other and press against temperature control knob 3. The user fastens faceplate 11 to temperature control unit with fasteners that are not shown in the diagram. Now, when the geared electric motor is actuated by the microcontroller through one of the two relays, it will turn the driver pinch roller, 41. Since the driver pinch roller is pressing against temperature control knob 3 due to spring tension from spring 16, temperature control knob 3 will rotate. Since driven pinch roller, 49 is also pressing against temperature control knob 3, driven pinch roller 49 and hence, potentiometer shaft 45 will rotate. When shaft 45 rotates, the voltage on center tap 47, of the potentiometer will vary. This varies the digital output from the analog to digital converter on the microcontroller. Thus the microcontroller, by comparing digital value of the potentiometer voltage with the stored digital value, can determine when to de-energize the relay and stop the rotation of temperature control knob 3.

A drive driver pulley can be substituted for the driver pinch roller. In this case, a driven pulley should be securely fastened to the top of the temperature control knob so that the axis of rotation of the driven pulley is substantially the same as the axis of rotation of the temperature control knob. A belt means will connect the driver pulley with the driven pulley. Based on space availability, this drive means might be advantageous. If a positive drive is desired, then the driver pinch roller can be substituted with a driver gear. In that case, a driven gear should be securely fastened to the top of the temperature control knob so that the axis of rotation of the driven gear is substantially the same as the axis of rotation of the temperature control knob. Similarly, a position sensing gear can be substituted for the driven pinch roller on the position sensing means such that the driven gear on the temperature control knob communicates rotatetably with the position sensing gear to turn the potentiometer shaft.

Relays 57 and 58 can be substituted with opto-isolators or solid state relays to achieve the same function. The circuit connection for opto-isolators is shown in FIG. 8. Similarly, for position sensing, instead of a potentiometer, optical sensors can be used. Thus the same function can be implemented using multiple types of components.

Every minute, when the time changes, the microcontroller checks to see if the family is on vacation. If not, it compares the current time against the plurality of stored times. If it matches any one of them, it reads the corresponding desired temperature setting for the temperature control knob. Then it checks the digital value for the present position of temperature control knob 3. Comparing the two values, it determines whether the temperature control knob should be turned clockwise or counter clockwise and energizes the appropriate relay. While the relay is energizing the geared electric motor, the microcontroller continually reads the potentiometer center tap voltage and compares it with the stored temperature setting. Once the two values match, the microcontroller de-energizes the relay to stop the geared electric motor.

The microcontroller also checks continually for input from the first transmitter/receiver means and the first user input means. If input comes from the first user input means, then the display result is sent to the first display means. If input comes from the first transmitter/receiver means, then the display result is sent to the first transmitter/receiver means.

The first transmitter/receiver means continually checks for wireless input from a plurality of devices with which it is configured to communicate. Some examples of such devices are the remote user interface and the cellular telephone. The user may change the program from a different part of the house using the remote user interface. Or the user might realize, while on the road that he has forgotten to set the unit for vacation mode. In that instance he might use the cellular telephone to change the mode of operation. When the first transmitter/receiver means receives input wirelessly, it sets certain flags in its memory to indicate the source of input. Then it decodes the input and presents it to the microcontroller. When the microcontroller responds with display information, the first transmitter/receiver means encodes the information and transmits it wirelessly to the device from which it received the input data originally. For this purpose, it reads the status of flags it had set previously and determines the recipient of the display information. Then it clears those sets of flags, getting the unit ready for next wireless input.

What is claimed is:

1. A programmable water heater thermostat controller for controlling a temperature control knob on a water heater comprising:
   a) a drive means in mechanical communication with the temperature control knob on temperature control unit of a water heater;
   b) a position sensing means in mechanical communication with the temperature control knob and operative to detect and communicate continuously, present position data of temperature control knob;
   c) a microcontroller means in electrical communication with said position sensing means to receive said present position data;
   d) a faceplate to fit over temperature control unit;
   e) a driver mount means having a first end, a second end, a first attachment point and a first pivot point; said first pivot point located between said first end and said second end; said first attachment point located between said first pivot point and said first end; said drive means fixedly attached to said first end; said driver mount means attached rotatetably to said faceplate at said first pivot point; said second end protruding out beyond said faceplate;

f) a sensor mount means having a first end, a second end, a second attachment point and a second pivot point; said second pivot point located between said first end of said sensor mount means and said second end of said sensor mount means; said second attachment point located between said second pivot point and said first end of said sensor mount means; said position sensing means fixedly attached to said first end of said sensor mount means; said sensor mount means attached rotatetably to said faceplate at said second pivot point; said second end of said sensor mount means protruding out beyond said faceplate;

g) a first transmitter/receiver means configured to enable exchange of a plurality of user desired time and corresponding user desired temperature control knob setting data between said microcontroller means and a plurality of external transmitter/receiver means;

h) a first display means configured to receive display data from said microcontroller means and display it to the user;

i) a first user input means configured to be operable by the user to communicate desired times and corresponding temperature control knob setting data to said microcontroller means;

j) a tension spring having a first end rotatetably connected to said driver mount means at said first attachment point and a second end rotatetably connected to said sensor mount means at said second attachment point.

2. The programmable water heater thermostat controller of claim 1, wherein said microcontroller means is configured to:
a) keep track of current time;
b) accept and store a plurality of said user desired time and corresponding user desired temperature control knob setting data;
c) compare, when current time substantially equals stored user desired time, corresponding stored temperature control knob setting data with temperature control knob present position data from said position sensing means and determine direction of rotation of said drive means to reach said stored temperature control knob setting;
d) activate said drive means in determined direction;
e) deactivate said drive means when said stored temperature control knob setting data substantially matches temperature control knob present position data from said position sensing means.

3. The programmable water heater thermostat controller of claim 2, wherein said microcontroller means is further configured to:
a) accept vacation as a mode selection;
b) determine direction of rotation of said drive means to rotate temperature control knob to lowest temperature setting available when said vacation mode selected;
c) activate said drive means in determined direction;
d) deactivate said drive means when temperature control knob present position data from said position sensing means indicates lowest temperature setting reached;
e) deactivate stored temperature setting comparison till user input cancels said vacation mode selection.

4. The programmable water heater thermostat controller of claim 1, wherein said drive means comprises of a geared electric motor and an output means.

5. The programmable water heater thermostat controller of claim 4, wherein said output means is in mechanical communication with the temperature control knob.

6. The programmable water heater thermostat controller of claim 5, wherein said output means is a friction drive comprising of a driver pinch roller; rotational axis of said driver pinch roller substantially parallel to rotational axis of temperature control knob; distance between said rotational axis of said driver pinch roller and rotational axis of temperature control knob is substantially equal to the sum of the radii of said driver pinch roller and temperature control knob.

7. The programmable water heater thermostat controller of claim 5, wherein said output means is a driver gear; said driver gear in rotational communication with a driven gear fixedly fastened to top surface of said temperature control knob.

8. The programmable water heater thermostat controller of claim 5, wherein said output means is a drive pulley; said drive pulley rotatetably connected by belt means to a driven pulley fixedly fastened to the top surface of said temperature control knob.

9. The programmable water heater thermostat controller of claim 1, wherein said position sensing means comprises of a rotation sensor means and a rotation input means; said rotation input means fixedly attached to shaft of said rotation sensor means.

10. The programmable water heater thermostat controller of claim 9, wherein said rotation input means is in rotational communication with temperature control knob.

11. The programmable water heater thermostat controller of claim 10, wherein said rotation input means is a friction drive comprising of a driven pinch roller.

12. The programmable water heater thermostat controller of claim 9, wherein said rotation sensor means is a potentiometer.

13. The programmable water heater thermostat controller of claim 9, wherein said rotation sensor means is an optical sensor.

14. The programmable water heater thermostat controller of claim 1, wherein said first transmitter/receiver means is configured to:
a) receive data from a plurality of external transmitter/receiver means;
b) decode said received data for user input data;
c) make available said decoded user input data to said microcontroller means;
d) accept display data from said microcontroller means;
e) encode said display data for said plurality of external transmitter/receiver means to accept;
f) transmit said encoded display data wirelessly to said plurality of external transmitter/receiver means.

15. The programmable water heater thermostat controller of claim 1, wherein said first user input means is a keyboard.

16. The programmable water heater thermostat controller of claim 1, wherein said first user input means is a plurality of switches.

17. The programmable water heater thermostat controller of claim 1, further comprises of a remote user interface having a second user input means, a second display means and a second transmitter/receiver means; said second transmitter/receiver means configured to communicate seamlessly with said first transmitter/receiver means, said second user input means and said second display means.

18. The programmable water heater thermostat controller of claim 17, wherein said second user input means is a keyboard.

19. The programmable water heater thermostat controller of claim 17, wherein said second user input means is a plurality of switches.

20. The programmable water heater thermostat controller of claim 1, wherein said external transmitter/receiver means is a cellular telephone.

21. The programmable water heater thermostat controller of claim 1, wherein said drive means and said position sensing means pull away from each other and from temperature control knob when said second end of said driver mount and said second end of said sensor mount are pushed toward each other;

said second end of said driver mount and said second end of said sensor mount normally kept away from each other by said tension spring.

\* \* \* \* \*